(12) United States Patent
Jang et al.

(10) Patent No.: US 11,908,175 B2
(45) Date of Patent: Feb. 20, 2024

(54) ELECTRONIC DEVICE TRAINING IMAGE RECOGNITION MODEL AND OPERATION METHOD FOR SAME

(71) Applicant: SAMSUNG ELECTRONICS CO., LTD., Suwon-si (KR)

(72) Inventors: Seowoo Jang, Suwon-si (KR); Sangung Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 17/693,095

(22) Filed: Mar. 11, 2022

(65) Prior Publication Data

US 2022/0198786 A1 Jun. 23, 2022

Related U.S. Application Data

(63) Continuation of application No. PCT/KR2020/004610, filed on Apr. 6, 2020.

(30) Foreign Application Priority Data

Sep. 11, 2019 (KR) .................. 10-2019-0113023

(51) Int. Cl.
*G06V 10/00* (2022.01)
*G06V 10/774* (2022.01)
*G06V 10/94* (2022.01)

(52) U.S. Cl.
CPC ........ *G06V 10/7747* (2022.01); *G06V 10/945* (2022.01)

(58) Field of Classification Search
CPC .. G06V 10/7747; G06V 10/945; G06V 10/10; G06V 10/774; G06V 10/70; G06V 10/766; G06V 30/191; G06V 30/19147; G06N 20/00; H04N 5/2355; H04N 5/007; H04N 5/235; H04N 5/351; H04N 9/3188; G06T 7/246; G06T 7/251; G06T 2207/20081; G06F 18/21; G06F 18/214

See application file for complete search history.

(56) References Cited

U.S. PATENT DOCUMENTS 8,510,283 B2 * 8/2013 Hull ...................... G06F 18/214
707/723
8,825,682 B2 * 9/2014 Kishi ................... G06V 30/414
707/711

(Continued)

FOREIGN PATENT DOCUMENTS

JP         6548691        7/2019
KR    10-2017-0074413    6/2017

(Continued)

*Primary Examiner* — Amir Alavi
(74) *Attorney, Agent, or Firm* — Nixon & Vanderhye, P.C.

(57) ABSTRACT

A method of training an image recognition model includes: generating a virtual dynamic vision sensor (DVS) image using a virtual simulator; generating label information including information about a correct answer to a result of recognition of the DVS image by the image recognition model, with respect to the DVS image; and training the image recognition model by modifying the image recognition model so that a difference between the result of recognition of the DVS image by the image recognition model and the label information is reduced.

15 Claims, 4 Drawing Sheets

(56) References Cited

U.S. PATENT DOCUMENTS

| | | | | |
|---|---|---|---|---|
| 8,856,108 B2* | 10/2014 | Erol | ..................... | G06V 30/414 |
| | | | | 707/723 |
| 8,868,555 B2* | 10/2014 | Erol | ..................... | G06F 16/955 |
| | | | | 707/736 |
| 9,020,966 B2* | 4/2015 | Erol | ..................... | G06V 30/414 |
| | | | | 707/718 |
| 10,565,458 B2 | 2/2020 | Fukuhara et al. | | |
| 11,080,891 B2 | 8/2021 | Kim et al. | | |
| 11,106,273 B2* | 8/2021 | Hazra | ..................... | G06F 3/017 |
| 11,256,954 B2* | 2/2022 | George | ................... | G06N 3/088 |
| 11,431,660 B1* | 8/2022 | Leeds | ..................... | G10L 15/22 |
| 11,574,470 B2* | 2/2023 | Anorga | ................... | G06V 20/20 |
| 11,676,269 B2* | 6/2023 | Brozek | ................. | G16H 50/50 |
| | | | | 382/133 |
| 2018/0174323 A1 | 6/2018 | Ji et al. | | |
| 2019/0090786 A1 | 3/2019 | Kim et al. | | |
| 2019/0096068 A1 | 3/2019 | Fontanel et al. | | |
| 2019/0096081 A1 | 3/2019 | Gupta et al. | | |
| 2019/0392256 A1 | 12/2019 | Cho | | |
| 2020/0034524 A1* | 1/2020 | Han | ....................... | G06N 3/045 |
| 2022/0198786 A1* | 6/2022 | Jang | ..................... | G06V 10/774 |

FOREIGN PATENT DOCUMENTS

| | | |
|---|---|---|
| KR | 10-2018-0093582 | 8/2018 |
| KR | 10-2019-0096866 | 8/2019 |
| KR | 10-2019-0099185 | 8/2019 |

\* cited by examiner

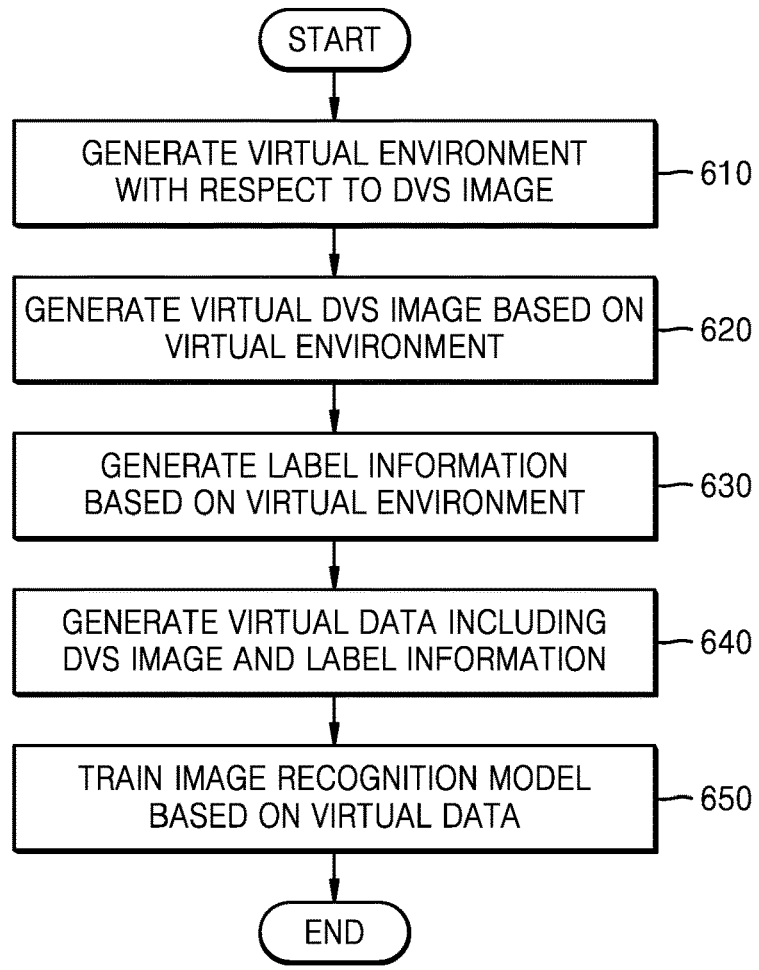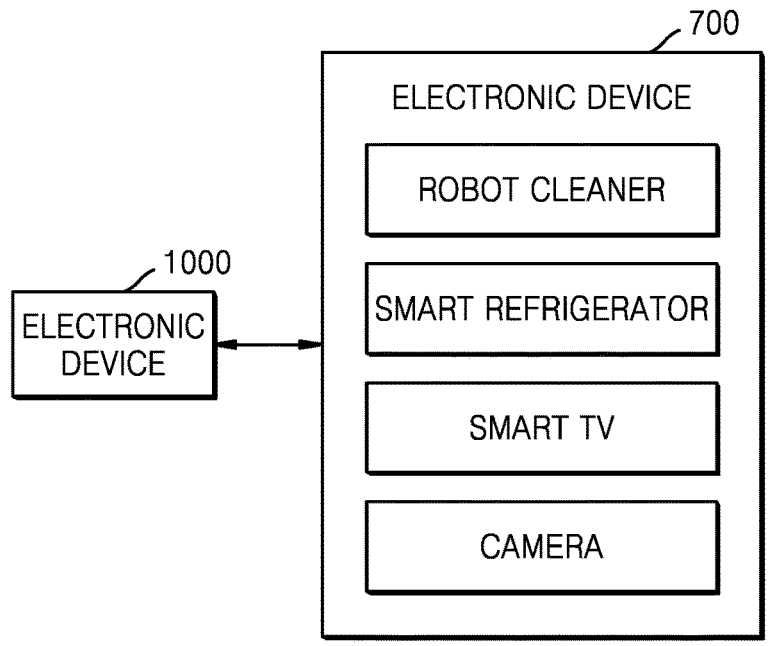

ELECTRONIC DEVICE TRAINING IMAGE RECOGNITION MODEL AND OPERATION METHOD FOR SAME

CROSS-REFERENCE TO RELATED APPLICATIONS

This application is a continuation of International Application No. PCT/KR2020/004610 designating the United States, filed on Apr. 6, 2020, in the Korean Intellectual Property Receiving Office and claiming priority to Korean Patent Application No. 10-2019-0113023, filed on Sep. 11, 2019, in the Korean Intellectual Property Office, the disclosures of which are incorporated by reference herein in their entireties.

BACKGROUND

Field

The disclosure relates to an electronic device for training an image recognition model that recognizes an image, and an operating method thereof.

Description of Related Art

A dynamic vision sensor (DVS) image captured by a DVS may include pixel data indicating an amount of change in light sensed by a moving object, unlike existing images including image data with respect to the entire region of the image. Therefore, unlike existing images, a DVS image has the advantage of a fast processing speed because an amount of data to be processed is small, and may be utilized in various operations that may be performed by sensing a moving object.

An image recognition model is an artificial intelligence model for recognizing a DVS image, and may be used, for example, to recognize a moving object captured from a DVS image, and to extract data related to the moving object. The image recognition model may be trained based on data related to a plurality of DVS images.

However, when an amount of data for training the image recognition model is insufficient, the accuracy and performance of the image recognition model may deteriorate. Therefore, there is a need for a method of constructing an image recognition model, having high accuracy and performance even when the amount of data related to the DVS image for training the image recognition model is insufficient.

SUMMARY

Embodiments of the disclosure provide an electronic device for training an image recognition model and an operating method thereof.

Embodiments of the disclosure provide a computer-readable recording medium having recorded thereon a program for executing the method on a computer. The disclosure is not limited to the above aspects, and there may be other aspects of the disclosure.

According to an example embodiments of the disclosure, there is provided a method of training an image recognition model including: generating a virtual dynamic vision sensor (DVS) image using a virtual simulator; generating label information including information about a correct answer to a result of recognizing the DVS image by the image recognition model with respect to the DVS image; and training the image recognition model by modifying the image recognition model so that a difference between the result of recognizing the DVS image by the image recognition model and the label information is minimized.

According to an example embodiment of the disclosure, there is provided an electronic device configured to train an image recognition model including: a memory storing the image recognition model; and at least one processor configured to: generate a virtual dynamic vision sensor (DVS) image using a virtual simulator, generate label information comprising information about a correct answer to a result of recognizing the DVS image by the image recognition model with respect to the DVS image, and train the image recognition model by modifying the image recognition model so that a difference between the result of recognizing the DVS image by the image recognition model and the label information is minimized.

According an example embodiment of the disclosure, there is provided a recording medium having stored therein a program for performing the method according to the above method.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 6 is a flowchart illustrating an example method of training an image recognition model based on virtual data according to various embodiments; and FIG. 7 is a block diagram illustrating an example of an electronic device and an external device according to various embodiments.

DETAILED DESCRIPTION

Figure 1:
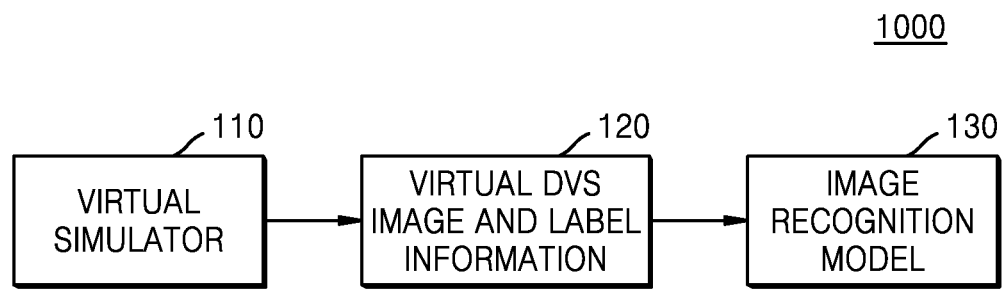
FIG. 1 is a block diagram illustrating an example of training an image recognition model according to various embodiments.

Hereinafter, various example embodiments of the disclosure will be described in greater detail with reference to the accompanying drawings. However, it should be understood that the disclosure may be embodied in different ways and is not limited to embodiments described herein. In addition, portions irrelevant to the description may be omitted from the drawings for clarity, and like components are denoted by like reference numerals throughout the disclosure.

Throughout the disclosure, when an element is referred to as being "connected to" another element, the element may be "directly connected to" the other element, or the element may also be "electrically connected to" the other element with an intervening element therebetween. In addition, when an element is referred to as "including" or "comprising" another element, unless otherwise stated, the element may further include or comprise yet another element rather than preclude the yet other element.

Functions related to artificial intelligence according to the disclosure may be operated through a processor and a memory. The processor may include at least one processor. In this regard, the at least one processor may be a general-purpose processor such as a central processing unit (CPU), an application processor (AP), or a digital signal processor (DSP), a dedicated graphics processor such as a graphics processing unit (GPU) or a vision processing unit (VPU), or an artificial intelligence-dedicated processor such as a neural processing unit (NPU). The at least one processor may be controlled to process input data according to a predefined operation rule stored in the memory or an artificial intelligence model. Alternatively, when the at least one processor is an artificial intelligence-dedicated processor, the artificial intelligence-dedicated processor may be designed in a hardware structure specialized for processing a specific artificial intelligence model.

The predefined operation rule or the artificial intelligence model are made through training. Here, the expression "made through training" may refer, for example, to an existing artificial intelligence model being trained based on a learning algorithm using a large number of pieces of training data and thus made into a predefined operation rule or an artificial intelligence model, which is set to fulfill an intended feature (or purpose). The training may be performed by a device itself, in which artificial intelligence according to the disclosure is performed, or may be performed through a separate server and/or system. Examples of the learning algorithm include supervised learning, unsupervised learning, semi-supervised learning, and reinforcement learning, but are not limited thereto.

An artificial intelligence model may include a plurality of neural network layers. Each of the neural network layers has a plurality of weight values and performs a neural network operation through an operation between an operation result of a previous layer and the plurality of weight values. The plurality of weight values that the neural network layers have may be optimized by a result of training of the artificial intelligence model. For example, the plurality of weight values may be refined to minimize a loss value or cost value obtained by the artificial intelligence model during a training process. An artificial neural network may include a deep neural network (DNN), and may be, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

Hereinafter, the disclosure will be described in greater detail below with reference to the accompanying drawings.

FIG. 1 is a block diagram illustrating an example of training an image recognition model 130 according to various embodiments.

Referring to FIG. 1, an electronic device 1000 for training the image recognition model 130 according to an embodiment of the disclosure may obtain a virtual dynamic vision sensor (DVS) image and label information 120 with respect to the virtual DVS image through a virtual simulator 110, and train the image recognition model 130 based on the obtained virtual DVS image and label information 120. The electronic device 1000 according to an embodiment of the disclosure may train the image recognition model 130 by modifying the image recognition model 130 so that a difference between label information and a result of recognizing the virtual DVS image by the image recognition model 130 is minimized.

A method of training the image recognition model 130 according to an embodiment of the disclosure may be performed on various types of images as well as a DVS image. For example, the image recognition model 130 may be trained based on various types of images and label information generated through the virtual simulator 110.

The electronic device 1000 according to an embodiment of the disclosure may recognize at least one DVS image using the image recognition model 130 trained according to an embodiment of the disclosure. For example, as a result of recognizing the DVS image using the image recognition model 130, the electronic device 1000 may obtain information (e.g., size, location, identification information, movement direction, movement speed, state, etc. of an object included in the DVS image) about the DVS image, and perform various operations based on the obtained information.

The electronic device 1000 according to an embodiment of the disclosure may be implemented in various forms. For example, the electronic device 1000 described herein may include a digital camera, a smart phone, a laptop computer, a tablet PC, an electronic book terminal, a digital broadcasting terminal, a personal digital assistant (PDA), a portable multimedia player (PMP), a navigation system, an MP3 player, etc., but is not limited thereto.

The electronic device 1000 described herein may include a wearable device that may be worn by a user. The wearable device may include, but is not limited to, at least one of an accessory type device (for example, a watch, a ring, a wristband, an ankle band, a necklace, glasses, or contact lenses), a head-mounted device (HMD), a fabric or clothing-integrated device (for example, electronic clothes), a body-attached device (for example, a skin pad), or a bio-implantable device (for example, an implantable circuit).

The DVS image according to an embodiment of the disclosure may be an image generated by a DVS sensor. The DVS sensor according to an embodiment is an image sensor employing a method in which an iris of a person receives information, and is a sensor capable of obtaining image data of a moving object. For example, the DVS sensor may transmit the image data to a processor only when there is a local change due to a movement in a pixel unit. The DVS sensor according to an embodiment of the disclosure may transmit the image data to the processor only when a moving event occurs. Therefore, the DVS sensor according to an embodiment of the disclosure may not process data when the object is not moving but measures the moving object when the object is moving and transmits the data to the processor, thereby preventing and/or reducing wastage of data due to frames continuously transmitted by general image sensors to the image processor.

The DVS sensor according to an embodiment of the disclosure may address a problem that a general visual recognition system is vulnerable to a fast movement. In addition, the DVS sensor may overcome a blur phenomenon because the DVS sensor receives data on a per-pixel basis rather than on a frame-unit basis.

The DVS sensor according to an embodiment of the disclosure may have a resolution of microseconds. The DVS sensor may have a better temporal resolution than an ultra-high-speed camera that shoots thousands of frames per second (e.g., ultra-high-speed frames>1 K FPS). In addition, according to the DVS sensor, because power consumption and data storage requirements are also greatly reduced, a dynamic range (a range of brightness that s sensor is capable of distinguish) may also remarkably increase.

According to an embodiment of the disclosure, because an outline of the moving object is expressed in the image obtained by the DVS sensor, it may be advantageous to protect the privacy of a monitored object. In addition, the DVS sensor may generate the DVS image by sensing the movement of an object even in a dark place with little light.

An image recognition model for recognizing the DVS image according to an embodiment of the disclosure may be trained based on the DVS image generated by the DVS sensor and label information about the DVS image.

The label information according to an embodiment of the disclosure may include information about a correct answer for a result of recognizing the DVS image by the image recognition model. The label information according to an embodiment of the disclosure may include a plurality of pieces of information different from each other according to a type of information to be recognized from the DVS image. For example, the label information is information that may be recognized with respect to the same DVS image, and may include different types of information, such as a state of an object and a moving direction of the object.

According to an embodiment of the disclosure, the image recognition model may be trained based on a pair of at least one DVS image and label information corresponding to each DVS image. For example, the image recognition model may be trained by modifying the image recognition model so that a difference between the result of recognizing the DVS image by the image recognition model and the label information with respect to the DVS image is minimized.

For example, when the label information includes information indicating "a state in which a person is walking", the image recognition model may be trained to output the same or similar result as "a state in which a person is walking" as the result of recognizing the DVS image by the image recognition model.

However, when the pair of DVS image and label information for training the image recognition model is not sufficient for the image recognition model to be trained, there is a problem that the performance of the image recognition model may deteriorate.

For example, because label information needs to be directly input by a person, when the number of DVS images in which label information is present is absolutely small, the image recognition model may not be sufficiently trained, which may deteriorate the accuracy and performance of the image recognition model.

However, according to an embodiment of the disclosure, even when the pair of DVS image and label information for training the image recognition model is small, the electronic device 1000 may use the virtual simulator 110 to sufficiently generate the pair of virtual DVS image and label information, and thus the image recognition model may be sufficiently trained.

In addition, because the outline of a moving object is expressed in the DVS image according to an embodiment of the disclosure, a virtually generated DVS image and a real DVS image captured by the DVS sensor may be substantially similar in appearance. Therefore, according to the image recognition model trained based on the pair of DVS image and label information generated using the virtual simulator 110 according to an embodiment of the disclosure, image recognition may be performed even on the real DVS image with high performance and accuracy.

The virtual simulator 110 according to an embodiment of the disclosure may generate various types of virtual environments in which DVS images may be captured. For example, the virtual simulator 110 may generate various virtual environments such as a house, an office, and a road.

The virtual simulator 110 according to an embodiment of the disclosure may generate various types of virtual objects that may exist in a virtual environment, and may place the generated virtual objects in the virtual environment. According to an embodiment of the disclosure, in a real environment corresponding to the virtual environment, an object that may be captured as the real DVS image may be placed as a virtual object in the virtual environment. For example, virtual objects such as people, furniture, home appliances, and pets may be placed in a virtual environment of a house. In addition, virtual objects such as signs, cars, and lanes may be placed in a virtual environment of the road.

Accordingly, the virtual DVS image according to an embodiment of the disclosure may be generated based on the virtual environment generated by the virtual simulator 110 and at least one virtual object placed in the virtual environment. Also, the virtual DVS image according to an embodiment of the disclosure may be obtained as a plurality of image sequences in which scenes in which a virtual object moves or changes over time are captured.

The virtual simulator 110 according to an embodiment of the disclosure may generate the virtual DVS image that may be captured by the DVS sensor in the virtual environment. The virtual simulator 110 according to an embodiment of the disclosure may determine from least one camera view point in which an actual DVS sensor may be located in the virtual environment, and generate at least one virtual DVS image captured from each camera view point. The at least one virtual DVS image may be an image simultaneously captured from each camera view point.

For example, the virtual simulator 110 may generate the virtual DVS image captured in the virtual environment by generating a vision image that may be captured from the at least one camera view point in the virtual environment and generating the DVS image from the vision image. The DVS image is not limited to the vision image, and may be generated from other types of images. The disclosure is not limited to the above-described example, the virtual simulator 110 may generate a virtual DVS image captured in a virtual environment through various methods.

The label information with respect to the virtual DVS image according to an embodiment of the disclosure may be generated based on information about at least one of the virtual environment or the at least one virtual object placed in the virtual environment. The label information according to an embodiment of the disclosure may be obtained based on previously set information about the virtual environment and the at least one virtual object used to generate the virtual environment and the at least one virtual object.

According to an embodiment of the disclosure, the virtual simulator 110 may arrange a virtual object in the virtual environment so that the virtual object is placed or moved according to the previously set information. The label information according to an embodiment of the disclosure may be obtained based on information about predefined characteristic information with respect to at least one of the virtual environment or the virtual object.

For example, the virtual simulator 110 may arrange a vehicle in the virtual environment so that the vehicle moves along a previously designated path in the virtual environment. In addition, after a position and speed of the vehicle moving along the previously designated path are also previously set by the virtual simulator 110, the vehicle may be placed in the virtual environment according to the set information. Accordingly, label information with respect to a virtual DVS image in which the vehicle is captured may be obtained based on a path, location, speed, etc., which is information about characteristic information of the vehicle, which is previously set by the virtual simulator 110 to arrange the vehicle.

The label information according to an embodiment of the disclosure may be obtained based on characteristic information predefined by the virtual simulator 110 when the virtual environment and the virtual object are generated. Accordingly, the label information with respect to the virtual DVS image according to an embodiment of the disclosure may include more accurate information than label information directly input by the person with respect to a real image.

In addition, the label information according to an embodiment of the disclosure may be automatically obtained based on characteristic information predefined by the virtual simulator 110. The label information according to an embodiment of the disclosure may be automatically obtained based on the predefined characteristic information, when the virtual environment or the virtual object is generated by the virtual simulator 110. Accordingly, the label information according to an embodiment of the disclosure may be easily and quickly obtained by the electronic device 1000.

According to an embodiment of the disclosure, the label information may be automatically obtained whenever a virtual DVS image is generated based on the characteristic information predefined by the virtual simulator 110. Accordingly, according to an embodiment of the disclosure, as data for training the image recognition model 130, a large number of pairs of virtual DVS images and label information may be quickly and accurately generated in a short time.

The image recognition model 130 according to an embodiment of the disclosure may be trained based on the virtual DVS image generated by the virtual simulator 110 and the label information with respect to the virtual DVS image.

The electronic device 1000 according to an embodiment of the disclosure may train the image recognition model 130 by modifying at least one component included in the image recognition model 130 so that a difference between the label information and the information about the result of recognizing the DVS image by the image recognition model 130 is minimized and/or reduced. For example, a structure of a node, a weight value, a bias value, etc. included in the image recognition model 130 may be modified as the image recognition model 130 is trained.

The image recognition model 130 according to an embodiment of the disclosure may be a data recognition model based on a neural network such as a convolutional neural network (CNN), a deep neural network (DNN), a recurrent neural network (RNN), and a multi-layer perceptron (MLP) used to classify and detect an object in an image. The image recognition model 130 according to an embodiment of the disclosure is not limited to the above-described example, and may include various types of artificial intelligence models.

According to an embodiment of the disclosure, based on the image recognition model 130, the image recognition result may include, for example, information about an object recognized from an image, information about a location of the object recognized from the image, and information about a movement of the object recognized from the image. For example, when an image input to a data recognition model is a DVS image in which a "vehicle" is captured, a recognition result of the image of the data recognition model may include the "vehicle".

Accordingly, according to an embodiment of the disclosure, the image recognition model 130 may be trained so that a result close to the "vehicle" may be output when a real DVS image similar to a virtual DVS image is input to the image recognition model 130 based on the virtual DVS image including the "vehicle" and label information.

According to an embodiment of the disclosure, the image recognition model 130 may be trained based on a large number of pairs of virtual DVS images and label information generated quickly and accurately by the virtual simulator 110. Accordingly, even when the real DVS image and label information for training the image recognition model 130 are insufficient, the electronic device 1000 according to an embodiment of the disclosure may quickly obtain the image recognition model 130 having high accuracy and performance, based on pairs of virtual DVS images and label information.

The electronic device 1000 according to an embodiment of the disclosure may use an external server (not shown) to train the image recognition model 130 for recognizing a DVS image.

The external server according to an embodiment of the disclosure may be implemented as at least one computer device. The external server may be distributed in the form of a cloud and may provide commands, codes, files, contents, etc.

The external server may perform operations that the electronic device 1000 may execute. For example, the external server may generate the virtual DVS image and the label information for training the image recognition model 130 according to a request of the electronic device 1000. The external server may train the image recognition model 130 based on the generated virtual DVS image and label information, and transmit the trained image recognition model 130 to the electronic device 1000. The external server may transmit, to the electronic device 1000, a result of recognizing a real DVS image by the trained image recognition model 130 according to an embodiment of the disclosure.

According to an embodiment of the disclosure, the image recognition model 130 may be trained on the electronic device 1000 and a result of recognizing an image by the image recognition model 130 may be output without data transmission and reception with an external server (not shown), according to an on-device AI technology. For example, the electronic device 1000 may train the image recognition model 130 according to an embodiment of the disclosure according to the generated DVS image, based on various types of information collected by the electronic device 1000 in real time, without having to use big data stored in the external server.

According to the on-device AI technology, the electronic device 1000 may be trained by itself based on data collected by itself, and may make a decision by itself based on a trained AI model. According to the on-device AI technology, the electronic device 1000 operates by itself without transmitting the collected data to the outside, and thus there is an advantage in terms of protection of personal information of a user and a data processing speed.

For example, the electronic device 1000 may operate using the on-device AI technology without a connection with the external server, according to whether a network environment of the electronic device 1000 is unstable, or whether only the information collected by the electronic device 1000 is sufficient to perform an operation according to an embodiment of the disclosure according to the AI model trained by the electronic device 1000 without having to use big data.

However, the electronic device 1000 is not limited to operating according to the on-device AI technology, and may perform the operation according to an embodiment of the disclosure through data transmission and reception with an external server or an external device. The electronic device 1000 may perform the operation according to an embodiment of the disclosure by combining the above-described on-device AI technology and a method through data transmission and reception with the external server.

For example, the operation according to an embodiment of the disclosure may be performed according to the method through the external server when an operation through the external server is more advantageous in terms of the data processing speed according to a network environment and a computing power of the electronic device 1000, or when the method through the external server is more advantageous than the on-device AI technology such as data that does not include the personal information of the user is transmitted to the external server.

Figure 2:
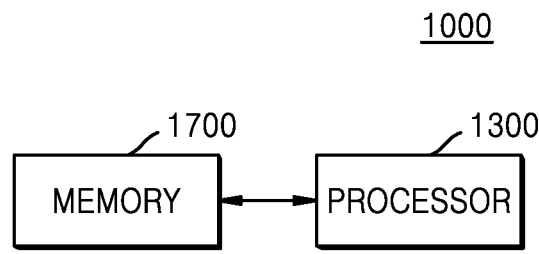
FIG. 2 is a block diagram illustrating an example configuration of an electronic device according to various embodiments.

FIG. 2 is a block diagram illustrating an example configuration of the electronic device 1000 according to various embodiments.

Figure 3:
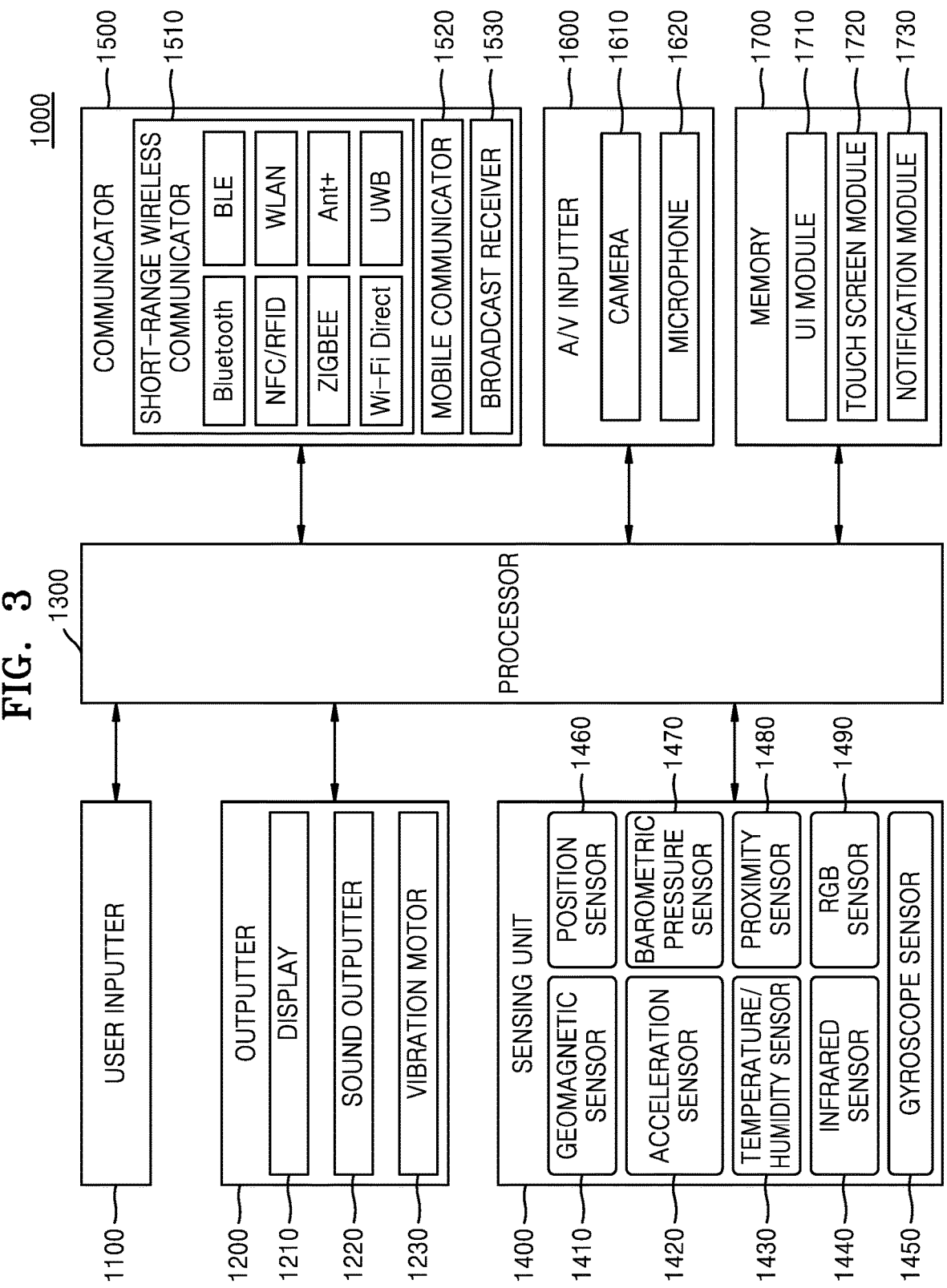
FIG. 3 is a block diagram illustrating an example configuration of an electronic device according to various embodiments.

FIG. 3 is a block diagram illustrating an example configuration of the electronic device 1000 according to various embodiments.

Referring to FIG. 2, the electronic device 1000 may include a processor (e.g., including processing circuitry) 1300 and a memory 1700. However, not all of the components shown in FIG. 2 are indispensable components of the electronic device 1000. The electronic device 1000 of FIG. 2 may be implemented by more components or less components than the components shown in FIG. 2.

For example, as shown in FIG. 3, the electronic device 1000 according to an embodiment of the disclosure may further include a communicator (e.g., including communication circuitry) 1520, an outputter (e.g., including output circuitry) 1020, a user inputter (e.g., including input circuitry) 1100, a sensing unit (e.g., including at least one sensor) 1400, and an audio/video (A/V) inputter (e.g., including A/V input circuitry) 1600, in addition to the processor 1300 and the memory 1700.

The user inputter 1100 may include various circuitry for inputting data for a user to control the electronic device 1000. For example, the user inputter 1100 may include a keypad, a dome switch, a touch pad (a touch capacitive type, a pressure resistive type, an infrared beam sensing type, a surface acoustic wave type, an integral strain gauge type, a piezoelectric type, etc.), a jog wheel, a jog switch, etc. but is not limited thereto.

According to an embodiment of the disclosure, the user inputter 1100 may receive a user input for training the image recognition model 130.

The outputter 1200 may include various output circuitry and output an audio signal, a video signal, or a vibration signal, and the outputter 1200 may include a display 1210, a sound outputter 1220, and a vibration motor 1230.

The display 1210 displays and outputs information processed by the electronic device 1000. According to an embodiment of the disclosure, the display 1210 may display a virtual DVS image generated by the virtual simulator 110. Also, the display 1210 according to an embodiment of the disclosure may display a result of recognizing the DVS image by the image recognition model 130.

When the display 1210 and the touch pad form a layer structure to provide a touch screen, the display 1210 may be used as an input device in addition to an output device. The display 1210 may include at least one of a liquid crystal display, a thin film transistor-liquid crystal display, an organic light-emitting diode, a flexible display, a three-dimensional (3D) display, or an electrophoretic display. Also, according to an implementation form of the electronic device 1000, the electronic device 1000 may include two or more displays 1210.

The sound outputter 1220 may include various circuitry that outputs audio data received from the communicator 1500 or stored in the memory 1700.

The vibration motor 1230 may output a vibration signal. Also, the vibration motor 1230 may output a vibration signal when a touch is input to the touch screen.

The sound outputter 1220 and the vibration motor 1230 according to an embodiment of the disclosure may output information related to a result of training the image recognition model 130 based on the virtual DVS image and label information, or the result of recognizing the DVS image by the image recognition model 130.

The processor 1300 may include various processing circuitry and generally controls the overall operation of the electronic device 1000. For example, the processor 1300 may generally control the user inputter 1100, the outputter 1200, the sensing unit 1400, the communicator 1500, and the A/V inputter 1600 by executing programs stored in the memory 1700.

The electronic device 1000 may include at least one processor 1300. For example, the electronic device 1000 may include various types of processor such as a central processing unit (CPU), a graphics processing unit (GPU), and a neural processing unit (NPU).

The processor 1300 may be configured to process commands of a computer program by performing basic arithmetic, logic, and input/output operations. The commands may be provided to the processor 1300 from the memory 1700 or may be received through the communicator 1500 and provided to the processor 1300. For example, the processor 1300 may be configured to execute the commands according to program codes stored in a recording device such as memory.

The processor 1300 according to an embodiment of the disclosure may generate a virtual DVS image using the virtual simulator 110 and may generate label information with respect to the DVS image. The label information according to an embodiment of the disclosure may include information about a correct answer to the result of recognizing the DVS image by the image recognition model 130. The label information according to an embodiment of the disclosure may be obtained whenever the DVS image is generated, based on predefined characteristic information about at least one of a virtual environment or a virtual object placed in the virtual environment, which is previously set by the virtual simulator 110 when the DVS image is generated.

The processor 1300 according to an embodiment of the disclosure may train the image recognition model 130 by modifying at least one component included in the image recognition model 130 so that a difference between the label information and the information about the result of recognizing the DVS image by the image recognition model 130 is minimized.

In addition, the processor 1300 according to an embodiment of the disclosure may determine at least one camera view point in the virtual environment generated by the virtual simulator 110, and generate at least one virtual DVS image simultaneously captured from each camera view point. Accordingly, the image recognition model according to an embodiment of the disclosure may be trained based on the at least one virtual DVS image with respect to the at least one camera view point.

In addition, the processor 1300 according to an embodiment of the disclosure may generate a virtual environment based on information about a surrounding environment in which a real DVS image that may be recognized by the image recognition model may be captured, and, based on the virtual environment, generate a virtual DVS image. The virtual DVS image according to an embodiment of the disclosure may be generated based on changed information about the surrounding environment whenever the information about the surrounding environment changes by more than a reference value.

The processor 1300 according to an embodiment of the disclosure may recognize a DVS image using the image recognition model 130 and output a result thereof.

The sensing unit 1400 may include various sensors and sense a state of the electronic device 1000 or a state around the electronic device 1000, and may transfer sensed information to the processor 1300.

The sensing unit 1400 may include at least one of a geomagnetic sensor 1410, an acceleration sensor 1420, a temperature/humidity sensor 1430, an infrared sensor 1440, a gyroscope sensor 1450, and a position sensor. (e.g., GPS) 1460, a barometric pressure sensor 1470, a proximity sensor 1480, or an RGB sensor (illuminance sensor) 1490, but is not limited thereto.

The sensing unit 1400 according to an embodiment of the disclosure may further include a DVS sensor for capturing a DVS image.

According to an embodiment of the disclosure, based on the information sensed by the sensing unit 1400, a virtual environment may be generated or an object of the virtual environment may be generated and placed. The electronic device 1000 according to an embodiment of the disclosure may generate a virtual environment and an object that are highly likely to be captured as real DVS images by the DVS sensor of the electronic device 1000, based on the information sensed by the sensing unit 1400. For example, based on the information of the electronic device 1000, the electronic device 1000 may predict an environment in which the electronic device 1000 is currently placed, and based on the predicted environment, generate the virtual environment and the object of the virtual environment that are highly likely to be captured as real DVS images Accordingly, according to an embodiment of the disclosure, the image recognition model 130 may be trained based on a virtual DVS image that is highly likely to be captured as a real DVS image.

The communicator 1500 may include one or more components, each including various communication circuitry, that allow the electronic device 1000 to communicate with the server 2000 or an external device (not shown). For example, the communicator 1500 may include a short-range communicator 1510, a mobile communicator 1520, and a broadcast receiver 1530.

The short-range wireless communicator 1510 may include a Bluetooth communicator, a Bluetooth Low Energy (BLE) communicator, a near field communicator, a wireless local area network (WLAN) (Wi-Fi) communicator, a Zigbee communicator, an Infrared Data Association (IrDA) communicator (not shown), a Wi-Fi Direct (WFD) communicator, an ultra wideband (UWB), and an Ant+ communicator, but is not limited thereto.

The mobile communicator 1520 transmits and receives wireless signals to and from at least one of a base station, an external terminal, or a server on a mobile communication network. Here, the wireless signal may include various types of data according to transmission/reception of a voice call signal, a video call signal, or a text/multimedia message.

The broadcast receiver 1530 receives a broadcast signal and/or broadcast-related information from the outside through a broadcast channel. The broadcast channel may include a satellite channel and a terrestrial channel. According to an embodiment of the disclosure, the electronic device 1000 may not include the broadcast receiver 1530.

According to an embodiment of the disclosure, the communicator 1500 may transmit and receive data required for training the image recognition model 130.

The A/V inputter 1600 may include various components including various circuitry for inputting an audio signal or a video signal, and may include a camera 1610, a microphone 1620, etc. The camera 1610 may obtain an image frame such as a still image or a moving image through an image sensor in a video call mode or a photographing mode. The image captured through the image sensor may be processed through the processor 1300 or a separate image processing unit (not shown).

The microphone 1620 receives an external sound signal and processes the sound signal as electrical speech data.

The memory 1700 may store a program for processing and controlling the processor 1300, and may also store data input to or output from the electronic device 1000.

The memory 1700 according to an embodiment of the disclosure may store information necessary for generating a virtual DVS image and label information and training the image recognition model 130. For example, the memory 1700 may store the image recognition model 130. Also, the memory 1700 according to an embodiment of the disclosure may store information about the virtual simulator 110 that generates the virtual DVS image.

The memory 1700 may include at least one of a flash memory type storage medium, a hard disk type storage medium, a multimedia card micro type storage medium, card type memory (e.g., secure digital (SD) memory, eXtreme Digital (XD) memory, etc.), random access memory (RAM), static random access memory (SRAM), read-only memory (ROM), electrically erasable programmable read-only memory (EEPROM), programmable read-only memory (PROM), magnetic memory, a magnetic disk, or an optical disk.

The programs stored in the memory 1700 may be classified into a plurality of modules, for example, a UI module 1710, a touch screen module 1720, a notification module 1730, etc. according to functions thereof.

The UI module 1710 may provide a specialized UI, a graphic user interface (GUI), etc. that interact with the electronic device 1000 for each application. The touch screen module 1720 may sense a touch gesture of the user on a touch screen and may transfer information about the touch gesture to the processor 1300. The touch screen module 1720 according to some embodiments may recognize and analyze a touch code. The touch screen module 1720 may be configured as separate hardware including a controller.

Various sensors may be provided inside or near the touch screen to sense a touch or a proximity touch of the touch screen. An example of a sensor for sensing a touch with respect to the touch screen includes a tactile sensor. The tactile sensor refers to a sensor that senses a touch of a specific object to the extent or higher than that felt by a human. The tactile sensor may sense various information such as roughness of a contact surface, hardness of a contact object, and a temperature of a contact point.

The touch gesture of the user may include tap, touch and hold, double tap, drag, panning, flick, drag and drop, swipe, etc.

The notification module 1730 may generate a signal for notifying the occurrence of an event in the electronic device 1000.

Figure 4:
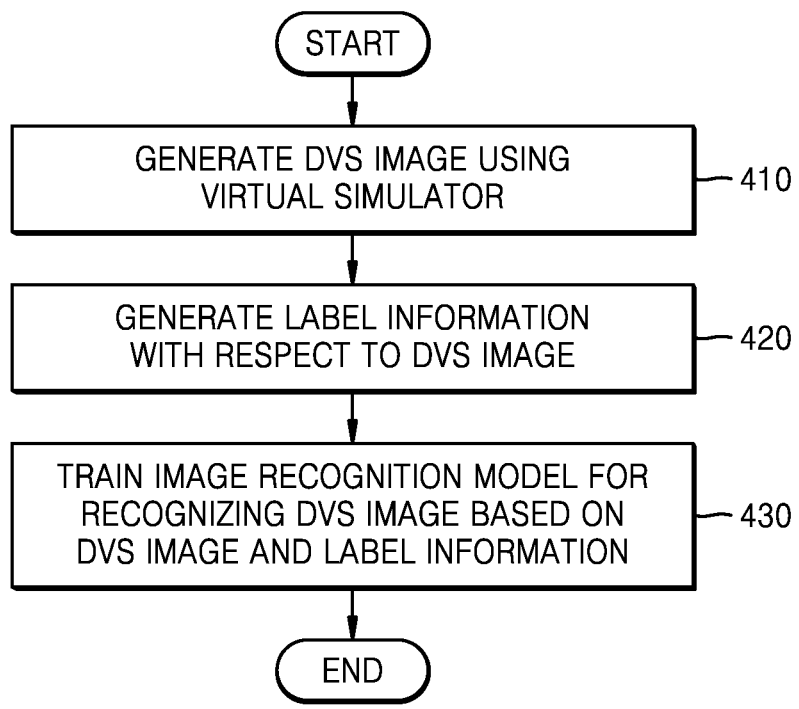
FIG. 4 is a flowchart illustrating an example method of training an image recognition model according to various embodiments.

FIG. 4 is a flowchart illustrating an example method of training the image recognition model 130 according to various embodiments.

Referring to FIG. 4, in operation 410, the electronic device 1000 according to an embodiment of the disclosure may generate a virtual DVS image using the virtual simulator 110. The electronic device 1000 according to an embodiment of the disclosure may generate a virtual environment through the virtual simulator 110 and may generate the virtual DVS image based on the virtual environment.

The virtual simulator 110 according to an embodiment of the disclosure may generate the virtual environment based on information about a surrounding environment in which a real DVS image recognized by the image recognition model may be captured. For example, based on information sensed by various sensors provided in the electronic device 1000, the electronic device 1000 may obtain information about the surrounding environment, and transmit the information about the surrounding environment to the virtual simulator 110.

The information about the surrounding environment according to an embodiment of the disclosure may include information about the surrounding environment of the electronic device 1000 including a DVS sensor that captures a DVS image, or a device other than the electronic device 1000.

Accordingly, according to an embodiment of the disclosure, the virtual simulator 110 may generate the virtual environment based on the information about the surrounding environment of the electronic device 1000 and may generate the virtual DVS image based on the generated virtual environment.

The information about the surrounding environment according to an embodiment of the disclosure may include a variety of information that may be sensed by a sensor of the electronic device 1000, such as a location and a movement state of the electronic device 1000, information sensed with respect to an object around the electronic device 1000, etc.

The electronic device 1000 according to an embodiment of the disclosure may determine whether the information about the surrounding environment obtained by the electronic device 1000 has changed by more than a reference value. The electronic device 1000 according to an embodiment of the disclosure may transmit the changed information about the surrounding environment to the virtual simulator 110 whenever the information about the surrounding environment changes by more than the reference value.

The virtual simulator 110 according to an embodiment of the disclosure may generate the virtual environment whenever the changed information about the surrounding environment is obtained from the electronic device 1000, and generate the virtual DVS image based on the generated virtual environment. Accordingly, according to an embodiment of the disclosure, whenever the information about the surrounding environment changes by more than the reference value, the virtual DVS image may be generated based on the changed information about the surrounding environment. Also, according to an embodiment of the disclosure, the image recognition model may be continuously trained based on the changed information about the surrounding environment of the electronic device 1000.

In operation 420, the electronic device 1000 according to an embodiment of the disclosure may generate label information with respect to the virtual DVS image. The label information according to an embodiment of the disclosure may include information about at least one correct answer to a result of recognizing the virtual DVS image by the image recognition model. The image recognition model according to an embodiment of the disclosure may be modified so that a difference between the result of the image recognition model and the correct answer information is minimized, so that the image recognition model may be updated.

The label information according to an embodiment of the disclosure may be determined based on information about the virtual environment generated by the virtual simulator 110. According to an embodiment of the disclosure, when a virtual object is placed in the virtual environment after the virtual environment is generated, the information about the virtual environment according to an embodiment of the disclosure may be determined according to predefined characteristic information about the virtual environment and the virtual object.

For example, when the virtual object is placed to move at a constant speed in the virtual environment, the label information may be determined based on identification information and movement information of the virtual object.

Because the label information according to an embodiment of the disclosure is generated based on the virtual environment and the virtual object implemented according to information previously set by the virtual simulator 110, the label information may be automatically generated whenever the virtual DVS image is generated. In addition, because the label information may be determined according to information previously set by the virtual simulator 110, the label information may include accurate and detailed information.

In operation 430, the electronic device 1000 according to an embodiment of the disclosure may train the image recognition model for recognizing the real DVS image based on the virtual DVS image and the label information corresponding to the virtual DVS image.

According to an embodiment of the disclosure, even when the DVS image data for training the image recognition model is insufficient, the image recognition model may be sufficiently trained based on the virtual DVS image generated by the virtual simulator 110. In addition, because the label information with respect to the virtual DVS image according to an embodiment of the disclosure may be determined according to accurate and detailed information previously set by the virtual simulator 110, the image recognition model is trained based on the label information, and thus the performance of the image recognition model may be better.

Figure 5:
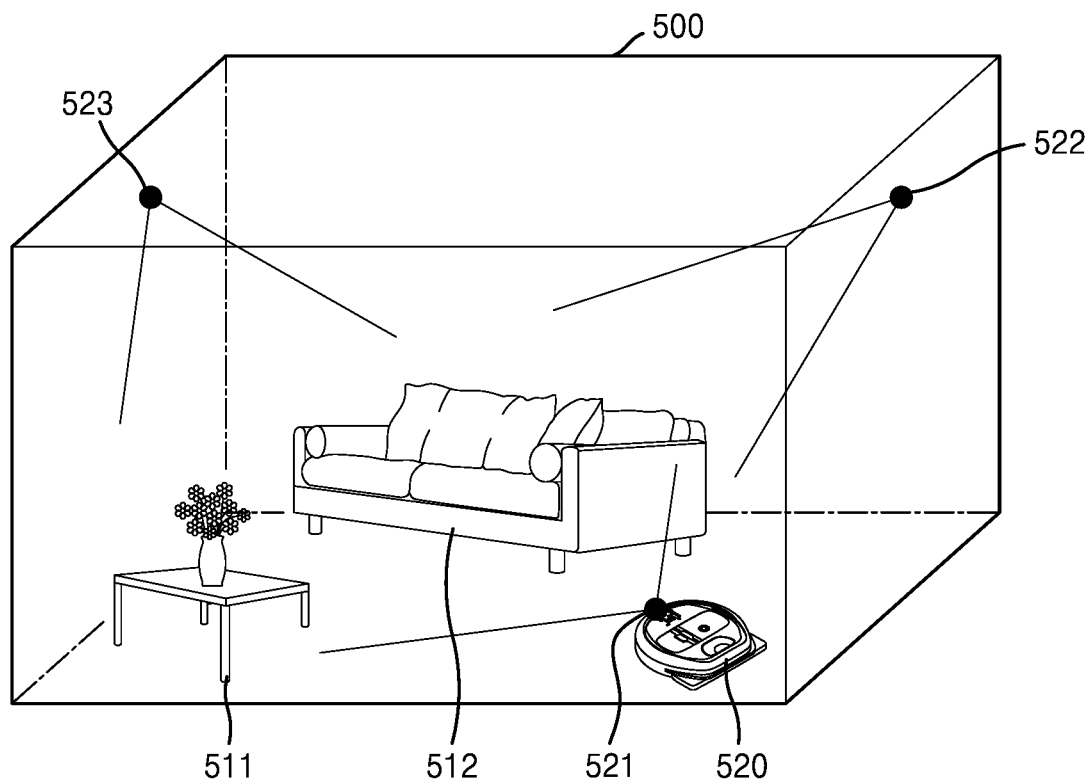
FIG. 5 is a diagram illustrating an example of a virtual environment generated by a virtual simulator according to various embodiments.

FIG. 5 is a diagram illustrating an example of a virtual environment generated by the virtual simulator 110 according to various embodiments.

Referring to FIG. 5, the virtual simulator 110 according to an embodiment of the disclosure may generate a virtual environment 500 in which, for example, an environment inside a house is implemented, and place a plurality of objects 511, 512, and 520 in the virtual environment 500.

In an embodiment of the disclosure, the plurality of objects 511, 512, and 520 that may be placed in the virtual environment 500 may be objects that are likely to be captured as a real DVS image in a real environment corresponding to the virtual environment 500.

In the virtual environment 500 according to an embodiment of the disclosure, a sofa 512 and a table 511, which are fixed objects, and a robot cleaner 520, which is an object that captures the virtual DVS image while moving, may be placed. The sofa 512, the table 511, and the robot cleaner 520 may be placed in previously designated positions in the virtual environment 500. In addition, the robot cleaner 520 may be placed to move in the virtual environment 500 according to previously designated path and speed.

The virtual DVS image according to an embodiment of the disclosure may be generated at each camera view point with respect to the plurality of DVS sensors 521, 522, and 523 placed in the virtual environment 500. According to an embodiment of the disclosure, in the virtual environment 500, the image recognition model 330 may be trained based on a plurality of virtual DVS images simultaneously captured from different camera view points. In addition, the virtual DVS image according to an embodiment of the disclosure may be obtained as a plurality of image sequences including a scene in which the robot cleaner 520 moves captured from different camera view points over time.

The DVS sensors 522 and 523 placed in fixed positions may obtain a virtual DVS image in which the robot cleaner 520 which is a moving object is sensed, except for the table 511 and sofa 512 which are fixed objects. The DVS sensor 521 disposed in the moving robot cleaner 520 may sense even a fixed object as a moving object in the DVS image due to the movement of the DVS sensor 521. Accordingly, the DVS sensor 521 disposed in the robot cleaner 520 may obtain the virtual DVS image in which not only the moving object but also the table 511 and the sofa 512 which are fixed objects are sensed.

Accordingly, according to an embodiment of the disclosure, the image recognition model 330 may be trained based on more precise and a lot of data, according to a plurality of virtual DVS images captured from different view points and in different moving states.

FIG. 6 is a flowchart illustrating an example method of training an image recognition model based on virtual data according to various embodiments.

The virtual data according to an embodiment of the disclosure may include a pair of a virtual DVS image and label information generated based on a virtual environment.

In operation 610, the electronic device 1000 according to an embodiment of the disclosure may generate the virtual environment with respect to a DVS image in order to obtain the virtual DVS image. The virtual environment according to an embodiment of the disclosure may be generated by previously defining characteristic information of the virtual environment (e.g., size, object, brightness, etc. of the virtual environment). For example, based on surrounding environment information sensed by the electronic device 1000, characteristic information related to the virtual environment may be previously set.

In operation 620, the electronic device 1000 according to an embodiment of the disclosure may generate the virtual DVS image based on the virtual environment. After generating the virtual environment, the electronic device 1000 according to an embodiment of the disclosure may determine at least one view point from which the virtual DVS image is captured.

The at least one view point from which the virtual DVS image is captured according to an embodiment of the disclosure may be fixed or moved. According to an embodiment of the disclosure, when the at least one view point from which the virtual DVS image is captured is a moving view point, information about movement, such as a movement path and speed, may be set, and the virtual DVS image may be generated according to the set information.

For example, when the virtual DVS image is captured by a DVS sensor included in a robot cleaner that is placed in the virtual environment and moves in a house, a movement path and speed of the robot cleaner may be set based on characteristic information of the robot cleaner. According to the set movement information, the virtual DVS image captured by the DVS sensor of the robot cleaner may be generated.

In operation 630, the electronic device 1000 according to an embodiment of the disclosure may generate label information with respect to the virtual DVS image generated in operation 620 based on the virtual environment. The label information according to an embodiment of the disclosure may include correct answer information indicating a correct answer to a result of recognizing the virtual DVS image by the image recognition model.

The label information according to an embodiment of the disclosure may be obtained when the correct answer information is determined, based on the above-described previously set characteristic information with respect to the virtual environment, previously set information about the moving path and speed of the DVS sensor that captures the DVS image, and previously set information regarding the virtual object included in the DVS image (e.g., location, movement speed, movement path, identification information, and state), etc.

The label information according to an embodiment of the disclosure may be determined based on information that needs to be previously set in order to generate the virtual environment and place the virtual object. Accordingly, at a time point at which the virtual DVS image is generated, the information used to determine the label information may be information already stored in the electronic device 1000 to generate the virtual environment and place the virtual object. The label information according to an embodiment of the disclosure may be automatically determined without another input from a user based on the information already stored in the electronic device 1000 in relation to the virtual environment.

In addition, the label information according to an embodiment of the disclosure may include at least one correct answer information indicating a correct answer to information that may be output by the image recognition model. For example, when identification information, state information, movement information, etc. about an object recognized in an image may be output as an image recognition result by the image recognition model, the label information may include at least one correct answer information respectively corresponding to the object recognition information and object state information, object movement information, etc.

In operation 640, the electronic device 1000 according to an embodiment of the disclosure may generate virtual data including the at least one virtual DVS image and the label information corresponding to each DVS image. In operation 650, the electronic device 1000 according to an embodiment of the disclosure may train the image recognition model based on the virtual data.

According to an embodiment of the disclosure, the image recognition model may be trained by modifying the image recognition model so that a recognition result by the image recognition model with respect to the virtual DVS image has a value close to the correct answer information of the label information.

FIG. 7 is a block diagram illustrating an example of the electronic device 1000 and an external device 700 according to various embodiments.

Referring to FIG. 7, an image recognition model trained by the electronic device 1000 according to an embodiment of the disclosure may be transmitted to the external device 700.

The external device 700 according to an embodiment of the disclosure may include a device including the image recognition model trained by the electronic device 1000 and recognizing a real DVS image obtained by the external device 700 based on the image recognition model. For example, the external device 700 may include a robot cleaner, a smart refrigerator, a smart TV, a camera, etc. that may be connected to the electronic device 1000, and is not limited to the above-described example, but may include various types of devices.

The electronic device 1000 according to an embodiment of the disclosure may generate the virtual DVS image that may be captured by each external device 700 and train the image recognition model based on the virtual DVS image. For example, the electronic device 1000 may generate the virtual DVS image that may be captured by a DVS sensor provided in the robot cleaner according to a movement path and speed of the robot cleaner among the external devices 700. In addition, the electronic device 1000 may generate a virtual DVS image that may be captured by a DVS sensor provided in each of the smart TV and the smart refrigerator according to locations of the smart TV and the smart refrigerator among the external devices 700.

The electronic device 1000 according to an embodiment of the disclosure may obtain label information with respect to the virtual DVS image that may be captured by each of the external devices 700 based on previously set information so as to generate the virtual environment. The previously set information may be characteristic information predefined with respect to at least one of a virtual environment or a virtual object of the virtual environment.

The electronic device 1000 according to an embodiment of the disclosure may train the image recognition model based on the virtual DVS image and the label information generated with respect to the at least one external device 700, and transmit the trained image recognition model to the at least one external device 700.

The at least one external device 700 according to an embodiment of the disclosure may recognize the DVS image obtained by each external device 700 based on the image recognition model received from the electronic device 1000.

For example, the smart TV among the external devices 700 may sense a movement of a user from the DVS image captured by the smart TV using the image recognition model and determine whether the user watches the TV. The smart TV according to an embodiment of the disclosure may perform various operations, for example, an operation of turning off or on the power of the smart TV, based on whether the user watches the TV.

As another example, the robot cleaner among the external devices 700 may predict a movement path of the user from the DVS image captured by the robot cleaner using the image recognition model. The robot cleaner according to an embodiment of the disclosure may determine the movement path of the robot cleaner based on the movement path of the user, and perform floor cleaning while moving according to the determined path.

In addition, the electronic device 1000 according to an embodiment of the disclosure may receive the DVS image obtained by each external device 700 rather than transmitting the image recognition model to the at least one external device 700. The electronic device 1000 according to an embodiment of the disclosure may recognize the DVS image received from each external device 700 based on the trained image recognition model according to an embodiment of the disclosure. The electronic device 1000 may perform an operation according to a result of recognizing the DVS image received from each external device 700 or transmit information related to the result to each external device 700.

According to an embodiment of the disclosure, even when data for training the image recognition model is not sufficient for training the image recognition model, based on a pair of DVS image and label information generated using a virtual simulator, the image recognition model may be sufficiently trained.

An embodiment of the disclosure may also be realized in a form of a recording medium including instructions executable by a computer, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, or a program module, and includes an arbitrary information transmission medium.

In addition, the term such as " . . . unit" or " . . . portion" used herein may refer to a hardware component such as a processor or a circuit, and/or a software component executed by the hardware component such as a processor.

It will be understood by one of ordinary skill in the art that the embodiments of the disclosure are provided for illustration and may be implemented in different ways without departing from the spirit and scope of the disclosure. Therefore, it should be understood that the foregoing example embodiments of the disclosure are provided for illustrative purposes only and are not to be understood in any way as limiting the disclosure. For example, each component described as a single type may be implemented in a distributed manner, and likewise, components described as being distributed may be implemented as a combined type.

The scope of the disclosure includes the appended claims and equivalents thereof, and any changes or modifications derived from the appended claims and equivalents thereof should be understood as falling within the scope of the disclosure. It should also be understood that any of the embodiment(s) described herein may be used in conjunction with any other embodiment(s) described herein.

What is claimed is:

1. A method of training an image recognition model, the method comprising:
   generating a virtual dynamic vision sensor (DVS) image using a virtual simulator;
   generating label information comprising information about a correct answer to a result of recognition of the DVS image by the image recognition model with respect to the DVS image; and
   training the image recognition model by modifying the image recognition model so that a difference between the result of recognition of the DVS image by the image recognition model and the label information is reduced.

2. The method of claim 1, wherein the virtual DVS image is generated based on a virtual environment generated by the virtual simulator, and a virtual object placed in the virtual environment.

3. The method of claim 2, wherein the label information is obtained based on predefined characteristic information with respect to at least one of the virtual environment or the virtual object.

4. The method of claim 2, wherein, in a real environment corresponding to the virtual environment, an object capable of being captured as a real DVS image, which is capable of being recognized by the image recognition model, is placed in the virtual environment as the virtual object.

5. The method of claim 1, wherein the generating of the virtual DVS image comprises:
   determining at least one camera view point in the virtual environment generated by the virtual simulator; and
   generating at least one virtual DVS image simultaneously captured from the at least one camera view point,
   wherein the image recognition model is trained based on the at least one virtual DVS image.

6. The method of claim 1, wherein, a virtual environment is generated by the virtual simulator based on information about a surrounding environment in which a real DVS image capable of being recognized by the image recognition model is capable of being captured, and the virtual DVS image is generated based on the virtual environment.

7. The method of claim 6, wherein, based on the information about the surrounding environment changing by more than a reference value, the virtual DVS image is generated based on the changed information about the surrounding environment.

8. A non-transitory computer-readable recording medium having recorded thereon a program which, when executed by a processor of an electronic device, cause the electronic device to perform operations including the method of claim 1.

9. An electronic device configured to train an image recognition model, the electronic device comprising:
   a memory storing the image recognition model; and
   at least one processor configured to: generate a virtual dynamic vision sensor (DVS) image using a virtual simulator, generate label information comprising information about a correct answer to a result of recognition of the DVS image by the image recognition model with respect to the DVS image, and train the image recognition model by modifying the image recognition model so that a difference between the result of recognizing the DVS image by the image recognition model and the label information is reduced.

10. The electronic device of claim 9, wherein the virtual DVS image is generated based on a virtual environment generated by the virtual simulator and a virtual object placed in the virtual environment.

11. The method of claim 10, wherein the label information is obtained based on predefined characteristic information with respect to at least one of the virtual environment or the virtual object.

12. The electronic device of claim 10, wherein, in a real environment corresponding to the virtual environment, an object capable of being captured as a real DVS image, which is capable of being recognized by the image recognition model, is placed in the virtual environment as the virtual object.

13. The electronic device of claim 9, wherein the at least one processor is further configured to: determine at least one camera view point in the virtual environment generated by the virtual simulator and generate at least one virtual DVS image simultaneously captured from the at least one camera view point,
   wherein the image recognition model is trained based on the at least one virtual DVS image.

14. The electronic device of claim 9, wherein, a virtual environment is generated by the virtual simulator based on information about a surrounding environment in which a real DVS image capable of being recognized by the image recognition mode is capable of being captured, and the virtual DVS image is generated based on the virtual environment.

15. The electronic device of claim 14, wherein, based on the information about the surrounding environment changing by more than a reference value, the virtual DVS image is generated based on the changed information about the surrounding environment.

* * * * *